United States Patent
Sasaki et al.

(10) Patent No.: US 6,628,587 B2
(45) Date of Patent: Sep. 30, 2003

(54) DISK DRIVE APPARATUS INCLUDING COMPENSATION AND ERROR CORRECTION CIRCUITS FOR HAVING A HIGH ACCURACY READING CAPABILITY

(75) Inventors: Takashi Sasaki, Kawagoe (JP); Takashi Suzuki, Kawagoe (JP); Koichi Kikuchi, Kawagoe (JP)

(73) Assignee: Pioneer Corporation, Tokyo (JP)

(*) Notice: Subject to any disclaimer, the term of this patent is extended or adjusted under 35 U.S.C. 154(b) by 0 days.

(21) Appl. No.: 09/801,873

(22) Filed: Mar. 9, 2001

(65) Prior Publication Data

US 2001/0055252 A1 Dec. 27, 2001

(30) Foreign Application Priority Data

Mar. 17, 2000 (JP) ........................................ 2000-075448

(51) Int. Cl.[7] .............................................. G11B 15/00
(52) U.S. Cl. .................................. 369/47.26; 369/59.23
(58) Field of Search .......................... 369/47.26–47.27, 369/59.23, 124.13

(56) References Cited

U.S. PATENT DOCUMENTS

| | | | | |
|---|---|---|---|---|
| 4,509,155 A | * | 4/1985 | Masuda et al. | 369/47.26 |
| 5,388,087 A | * | 2/1995 | Saiki et al. | 369/47.26 |
| 5,612,933 A | * | 3/1997 | Iso et al. | 369/47.27 |
| 5,703,852 A | * | 12/1997 | Kumagai | 369/53.3 |
| 6,069,864 A | * | 5/2000 | Kim | 369/116 |
| 6,289,059 B1 | * | 9/2001 | Yamaguchi et al. | 375/341 |

* cited by examiner

Primary Examiner—Aristotelis M. Psitos
(74) Attorney, Agent, or Firm—Morgan, Lewis & Bockius LLP (57) ABSTRACT

A disk drive apparatus reads information with high accuracy from an information read/write medium. Information recorded on the information read/write medium is optically read with a pickup, and in accordance with the read signal Sin, an RF signal generated by an RF signal generation circuit is supplied to a frequency characteristic compensation circuit to generate an RF signal having a compensated frequency characteristic. Here, the frequency characteristic compensation circuit 10 is an equalizer comprising a differential amplifier, fixed resistors, variable resistors, and variable capacitance element. Values of the variable resistors and the variable capacitance element are adjusted to variably adjust the frequency characteristic of the frequency characteristic compensation circuit.

10 Claims, 10 Drawing Sheets

DISK DRIVE APPARATUS INCLUDING COMPENSATION AND ERROR CORRECTION CIRCUITS FOR HAVING A HIGH ACCURACY READING CAPABILITY

BACKGROUND OF THE INVENTION

1. Field of the Invention

The present invention relates to a disk drive apparatus having a compensation means for reading information with high accuracy from an information read/write medium such as a CD and DVD.

2. Description of Related Art

A disk drive apparatus which reads information from an information read/write medium, such as a CD (Compact Disk) and DVD (Digital Video Disk or Digital Versatile Disk), performs error correction processing on a signal read, for example, from a CD by the pickup through CIRC (Cross Interleaved Reed Solomon Code) demodulation.

The error correction through the CIRC demodulation has a considerably superior capability for error correction. However, variations of the CD and DVD families have increased, being followed by an increased demand for a disk drive apparatus having compatibility by which such information read/write media can be commonly used. Accordingly, it is desired that a disk drive apparatus having a high accuracy reading capability be developed.

For example, to read information stored on different types of information read/write media, optically detected are signals affected by differences such as an optical characteristic or linear speed in reading of each information read/write medium. Error correction is then performed through the CIRC demodulation in accordance with the optically detected signals. As the result, technical problems have generally been pointed out that, for example, variations occur in the error correction rate depending on the type of the information read/write media, thereby making it difficult to improve the error correction rate.

OBJECT AND SUMMARY OF THE INVENTION

The present invention was developed to overcome the prior art problems mentioned above. It is an object of the present invention to provide a disk drive apparatus having compensation means for reading information, with higher accuracy, stored on an information read/write medium.

In order to achieve the aforementioned object, the present invention provides a disk drive apparatus, which reads information stored on an information read/write medium, characterized by comprising the following means.

That is, the disk drive apparatus according to the present invention comprises a pickup for optically reading information written on the aforementioned information read/write medium, and a signal generating means for generating an uncompensated RF signal in accordance with a signal read by the aforementioned pickup. The disk drive apparatus also comprises a compensation means for compensating the frequency characteristic of the aforementioned uncompensated RF signal to output a compensated RF signal, and a control means for adjusting the frequency characteristic of the compensation means with respect to the aforementioned uncompensated RF signal.

With such a configuration, suppose that the RF signal (uncompensated RF signal) generated by the signal generating means in accordance with the signal read by the pickup has changed in response to a difference in the type of information read/write media. In this case, the compensation means can adjust the frequency characteristic of the uncompensated RF signal to thereby generate an RF signal (compensated RF signal) having a waveform which is not affected by the differences in types of information read/write media. Thus, performing EFM or CIRC demodulation or the like in accordance with the compensated RF signal allows a reduction in error rate, thereby making it possible to improve reading accuracy.

DETAILED DESCRIPTION OF THE PREFERRED EMBODIMENT

Figure 1:
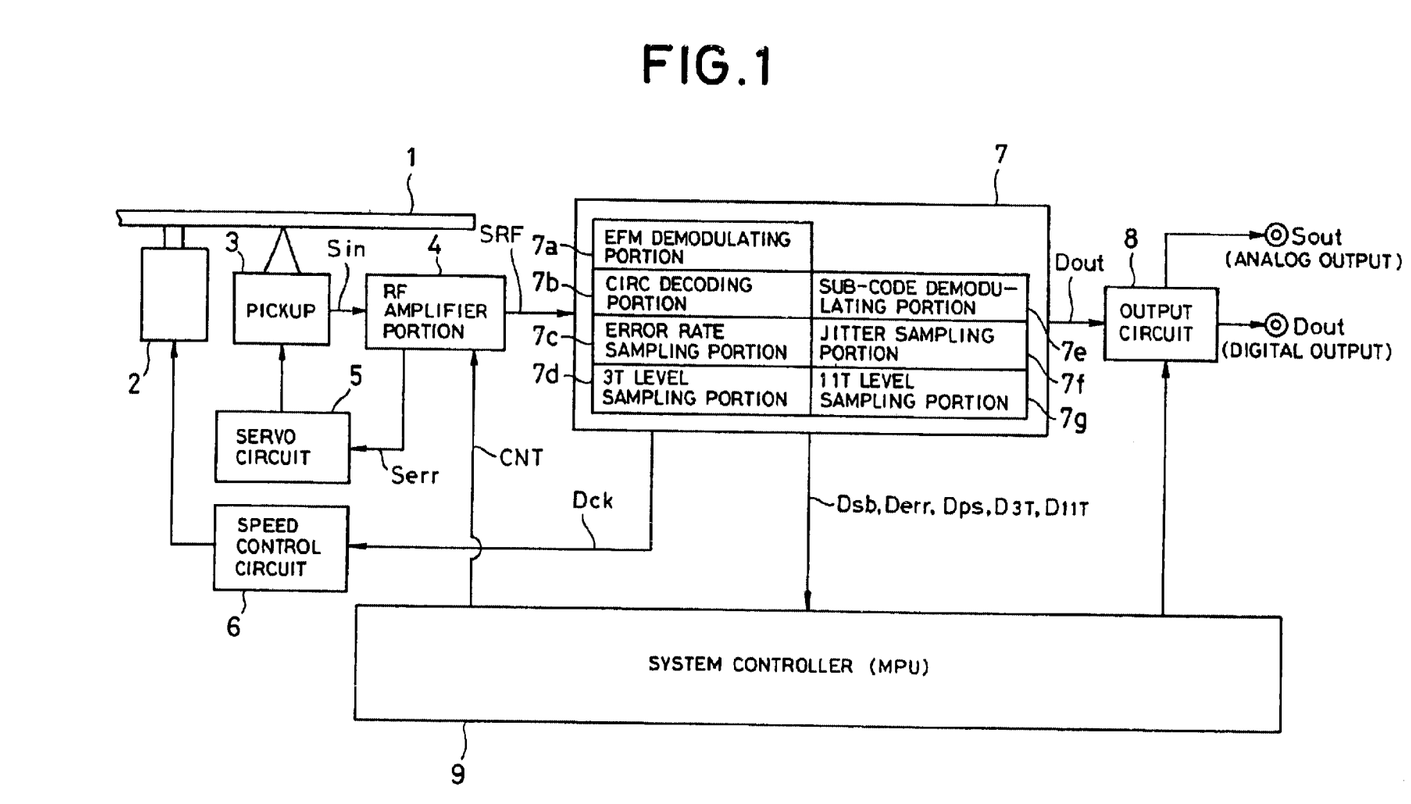
FIG. 1 is a block diagram illustrating the configuration of a disk drive apparatus as an embodiment of the present invention.
Figure 2:
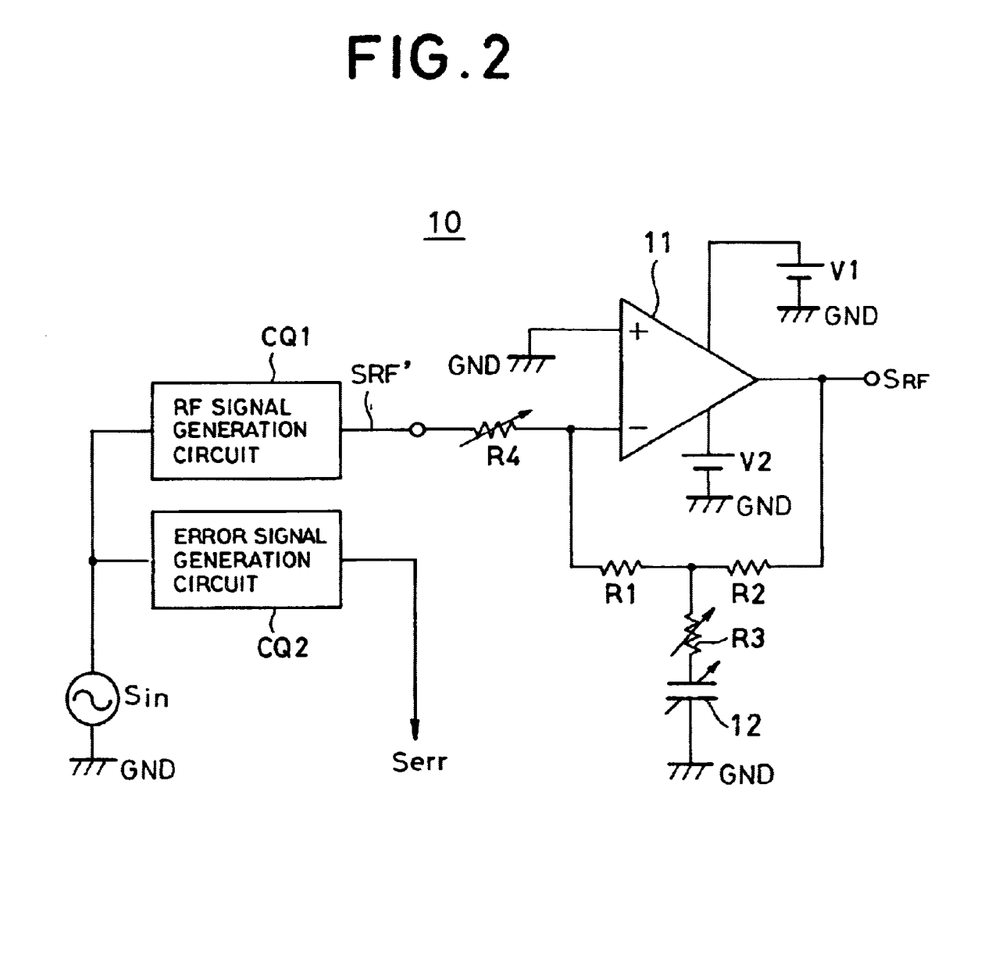
FIG. 2 is a circuit diagram illustrating the fundamental configuration of a frequency characteristic compensation circuit.
Figure 3:
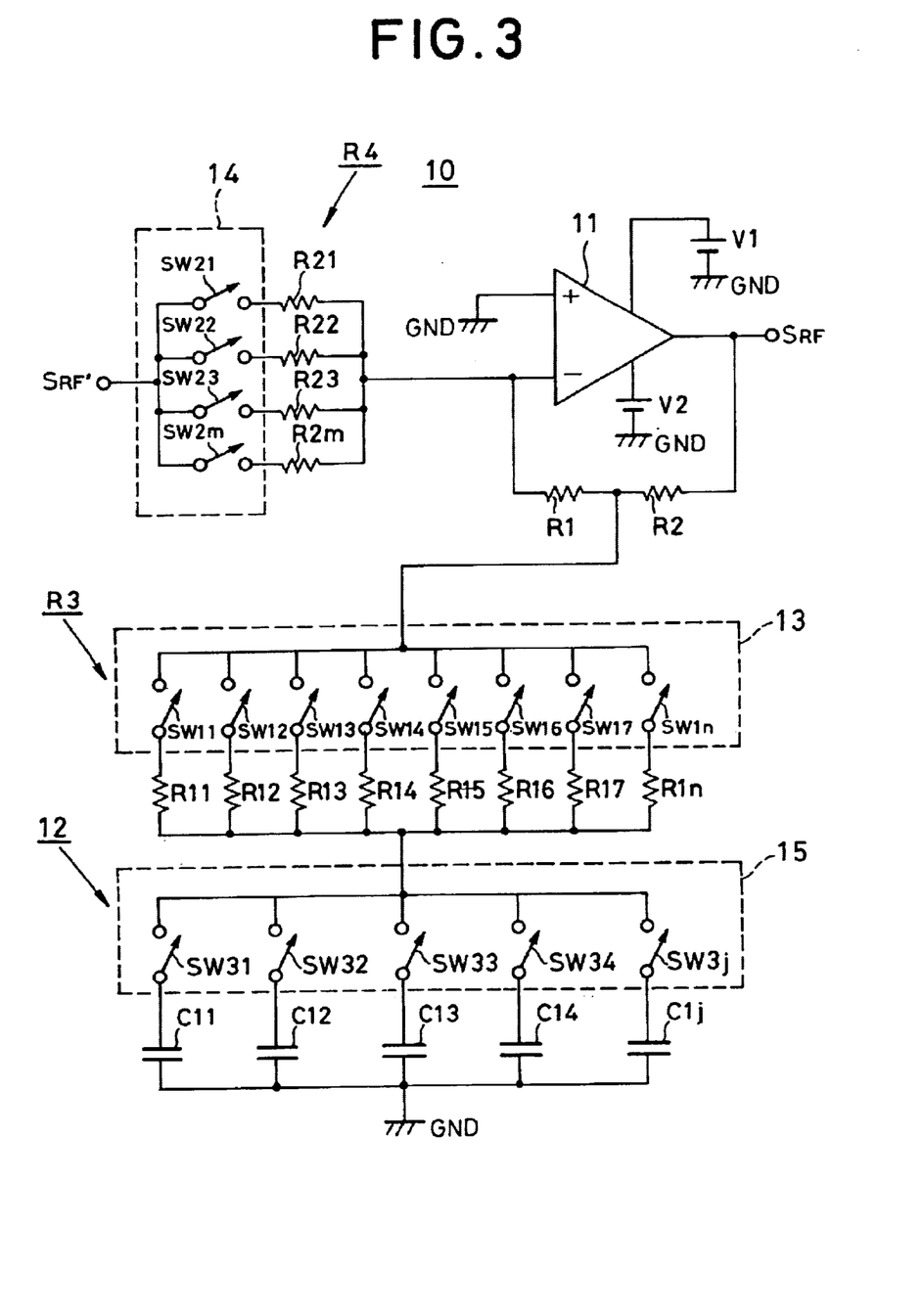
FIG. 3 is a circuit diagram illustrating a more specific configuration of the frequency characteristic compensation circuit.

A disk drive apparatus according to the present invention will be described below with reference to the drawings. Incidentally, FIG. 1 is a block diagram illustrating the configuration of the disk drive apparatus. FIGS. 2 and 3 are circuit diagrams illustrating the main portion of a frequency characteristic compensation circuit or a compensation means provided in the disk drive apparatus.

Referring to FIG. 1, the disk drive apparatus is provided with a spindle motor 2 for rotating an information read/write medium, that is, CD or DVD (hereinafter referred to as a disk) 1 at the position of a clamp. The disk drive apparatus also comprises a pick 3 for reading information optically on the disk 1.

The disk drive apparatus further comprises an RF amplifier portion 4 for generating an error signal Serr and an RF signal SRF from signal Sin read by the pickup 3 and outputting the resulting signals. The disk drive apparatus also comprises a servo circuit 5 for performing focus servo operation, tracking servo operation, and thread servo operation, on the pickup 3 in accordance with the error signal Serr. The disk drive apparatus also comprises a signal processing circuit 7 for performing information read processing in accordance with the RF signal SRF. The disk drive apparatus further comprises a speed control circuit 6 for controlling the rotational speed of the spindle motor 2 to a predetermined linear speed in accordance with a synchronization signal Dck that has been demodulated by EFM and synchronously detected by the signal processing circuit 7.

The aforementioned signal processing circuit 7 is made up of a digital signal processor (DSP). The signal processing circuit 7 comprises an EFM demodulating portion 7a for EFM (Eight to Fourteen Modulation) demodulating the RF signal SRF and a CIRC decoding portion 7b for CIRC demodulating the data which has been EFM demodulated. The signal processing circuit 7 also comprises a sub-code demodulating portion 7e for sampling sub-coding data Dsb included in the data which has been EFM demodulated and for supplying the sampled data to a system controller 9.

Accordingly, the signal processing circuit 7 supplies read data Dout, on which the CIRC decoding portion 7b has performed error correction, to an output circuit 8. The output circuit 8 is adapted to output the read data Dout as digital data, or convert the read data Dout to an analog signal Sout with a built-in D/A converter (not shown) to output the analog signal Sout.

The signal processing circuit 7 further comprises an error rate sampling portion 7c, a 3T level sampling portion 7d, and a jitter sampling portion 7f, and a 11T level sampling portion 7g.

The error rate sampling portion 7c samples an error rate in accordance with each piece of data of a C1 coding group and a C2 coding group and then supplies data Derr representative of the error rate to the system controller 9. Here, the C1 and C2 coding groups are generated when the CIRC decoding portion 7b performs error correction processing on the data EFM demodulated in the EFM demodulating portion 7a.

The jitter sampling portion 7f samples a phase error between a clock signal generated by a high accuracy oscillator (not shown) provided in the signal processing circuit 7 and the synchronization signal Dck. Then, the jitter sampling portion 7f supplies data Dps representative of the phase error to the system controller 9.

The 3T level sampling portion 7d samples a signal (hereinafter referred to as a "minimum width signal") representative of information on a minimum width pit included in the RF signals Srf to detect the amplitude (level) thereof, and supplies data D3T representative of the amplitude to the system controller 9. That is, the 3T level sampling portion 7d detects a signal read from a minimum width pit (also referred to as "minimum pit length") of the pits recorded on the disk 1.

The 11T level sampling portion 7g samples a signal (herein referred to as a "maximum width signal") representative of a maximum width pit included in the RF signal SRF to detect the amplitude (level) thereof, and supplies data D11T representative of the amplitude to the system controller 9. That is, the 11T level sampling portion 7g detects a signal read from a maximum width pit (also referred to as a "maximum pit length") of the pits recorded on the disk 1.

Incidentally, this embodiment is described with reference to a disk, as a typical example, on which information is recorded as the minimum pit width of 3T, and the maximum pit width of 11T. However, with a disk that includes other pit widths for recording information, the level sampling portion 7d, 7g are also configured to sample signals read from minimum and maximum pits.

The system controller 9 has a microprocessor (MPU) and controls the entire operation of the disk drive apparatus. The system controller 9 also outputs control data CNT for controlling a frequency characteristic of a frequency characteristic compensation circuit 10 provided at the RF amplifier portion 4, in accordance with each piece of data Derr, Dps, D3T, and D11T supplied from sampling portions 7c, 7f, 7d, and 7g, respectively.

The system controller 9 is provided with a memory portion (not shown) as a look-up table on which the control data CNT corresponding to the data Derr, Dps, D3T, and D11T has been recorded beforehand. The system controller 9 refers to the look-up table to output control data CNT corresponding to the data Derr, Dps, D3T, and D11T.

The configuration of the frequency characteristic compensation circuit 10 will now be described with reference to FIGS. 2 and 3. FIG. 2 illustrates the fundamental configuration of the frequency characteristic compensation circuit 10, and FIG. 3 illustrates a more specific configuration thereof.

Referring to FIG. 2, the frequency characteristic compensation circuit 10 is provided in the RF amplifier portion 4. In accordance with the read signal Sin supplied from the pickup 3, a known RF signal generation circuit CQ1 generates an RF signal SRF'. Then, the frequency characteristic compensation circuit 10 compensates the frequency characteristic of the uncompensated RF signal SRF', and outputs a compensated RF signal SRF to the signal processing circuit 7. The RF amplifier portion 4 is also provided with an error signal generation circuit CQ2 having a matrix amplifier that generates the aforementioned error signal Serr.

The frequency characteristic compensation circuit 10 comprises a differential amplifier 11 that operates at a power supply voltage V1 and a supply voltage V2 (V1>V2) and fixed resistors R1, R2 connected between an output terminal and an inverting input terminal of the differential amplifier 11. The frequency characteristic compensation circuit 10 also comprises a variable resistor R3 and a variable capacitance element 12 that are connected between a connection point of the fixed resistors R1, R2 and the ground terminal GND. The frequency characteristic compensation circuit 10 further comprises a variable resistor R4 connected to a non-inverting input terminal of the differential amplifier 11. Values of the variable resistors R3, R4 and the variable capacitance element 12 are automatically adjusted in response to the control data CNT from the system controller 9. An RF signal SRF having the frequency characteristic compensated in the uncompensated RF signal SRF' is thereby generated and supplied to the signal processing circuit 7.

The configuration of the frequency characteristic compensation circuit 10 will now be described more specifically. As shown in FIG. 3, the aforementioned variable resistor R3 comprises a switching circuit 13 having a plurality of analog switches SW11–SW1$n$, and a plurality of resistors R11–R1$n$ having different resistance values, each resistor being connected to each switch, respectively. In response to the control data CNT, each of the analog switches SW11–SW1$n$ is switched ON/OFF to variably adjust the resistance value of the variable resistor R3.

Similarly, the variable resistor R4 also comprises a switching circuit 14 having a plurality of analog switches SW21–SW2$m$, and a plurality of resistors R21–R2$m$ having different resistance values, each resistor being connected to each switch, respectively. In response to the control data CNT, each of the analog switches SW21–SW2$m$ is switched ON/OFF to variably adjust the resistance value of the variable resistor R4.

In addition, the variable capacitance element 12 also comprises a switching circuit 15 having a plurality of analog switches SW31–SW3$j$, and a plurality of capacitors C11–C1$j$ having different resistance values, each capacitor being connected to each switch, respectively. In response to the control data CNT, each of the analog switches SW31–SW3$j$ is switched ON/OFF to variably adjust the capacitance value of the variable capacitance element 12.

In such a configuration, in response to the control data CNT from the system controller 9, the frequency characteristic compensation circuit 10 switches the analog switches SW11–SW1$n$, SW21–SW2$m$, SW31–SW3$j$ ON/OFF, so as to adjust the frequency characteristic of the RF signal SRF for the uncompensated RF signal SRF'.

Incidentally, FIGS. 4 to 7 illustrate the characteristics of the frequency characteristic compensation circuit 10.

Figure 4:
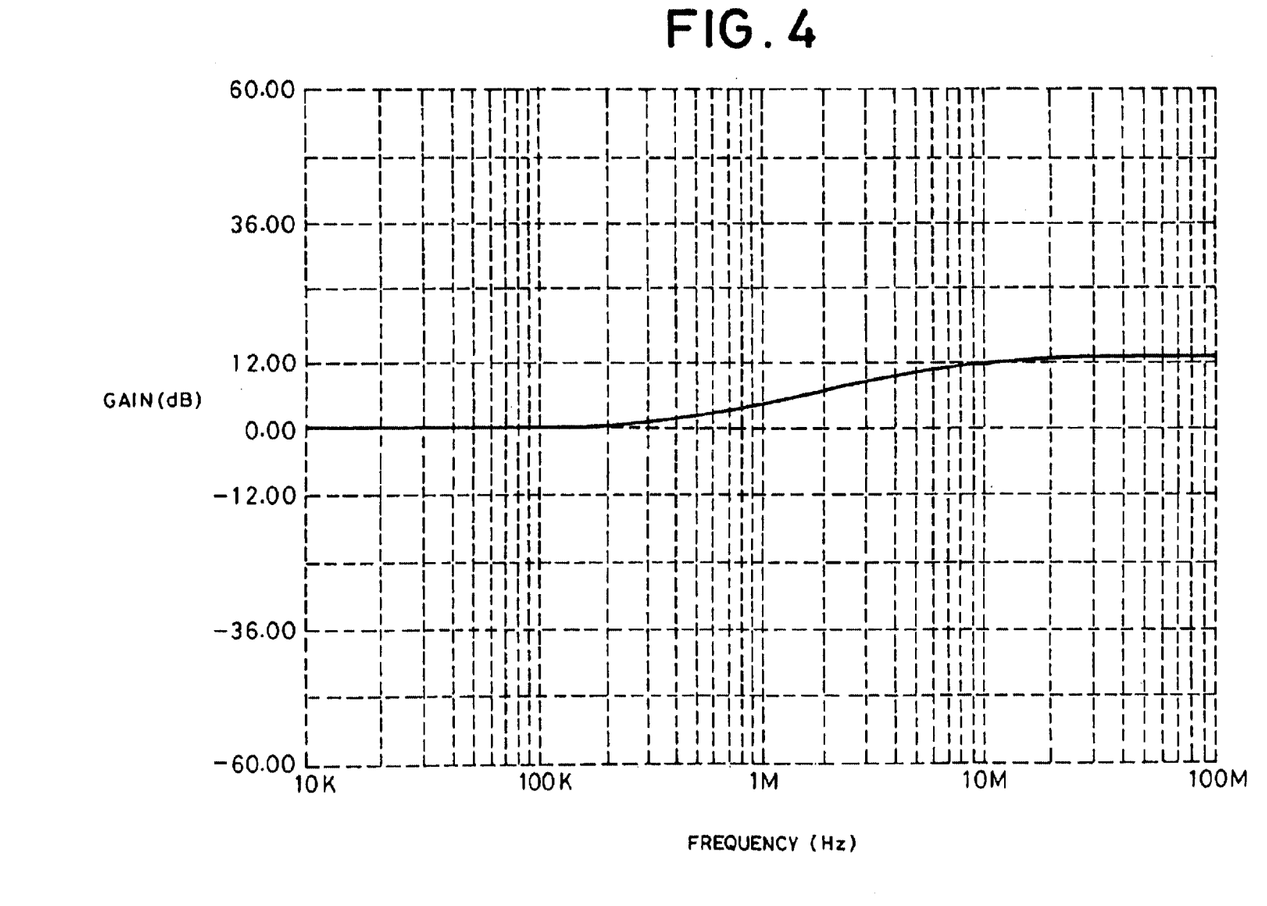
FIG. 4 is a characteristic graph illustrating the frequency characteristic of the frequency characteristic compensation circuit.

FIG. 4 illustrates a predetermined reference frequency characteristic thereof.

Figure 5:
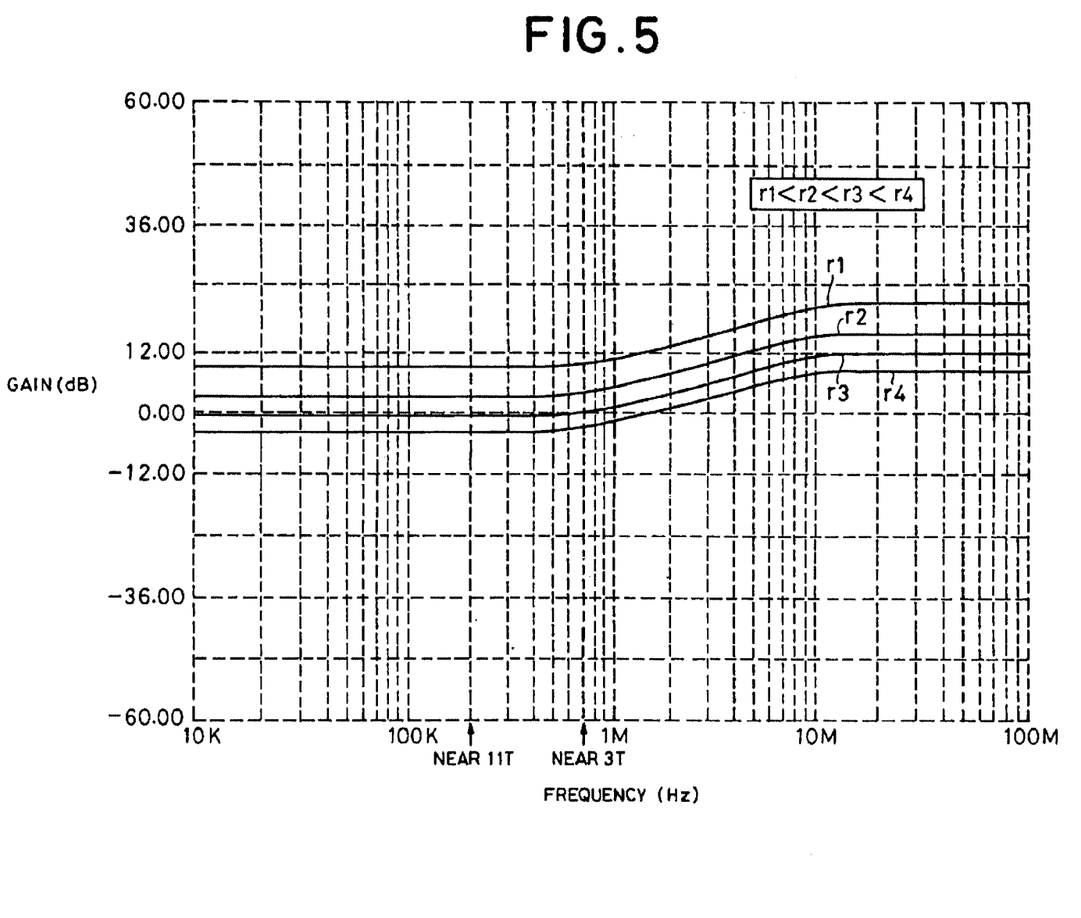
FIG. 5 is a characteristic graph illustrating the variably adjusted frequency characteristic of the frequency characteristic compensation circuit.

FIG. 5 illustrates changes in the frequency characteristics, as values of the variable resistor R4 are changed in the relationship of r1<r2<r3<r4 with the variable resistor R3 and the variable capacitance element 12 being fixed to reference values.

Figure 6:
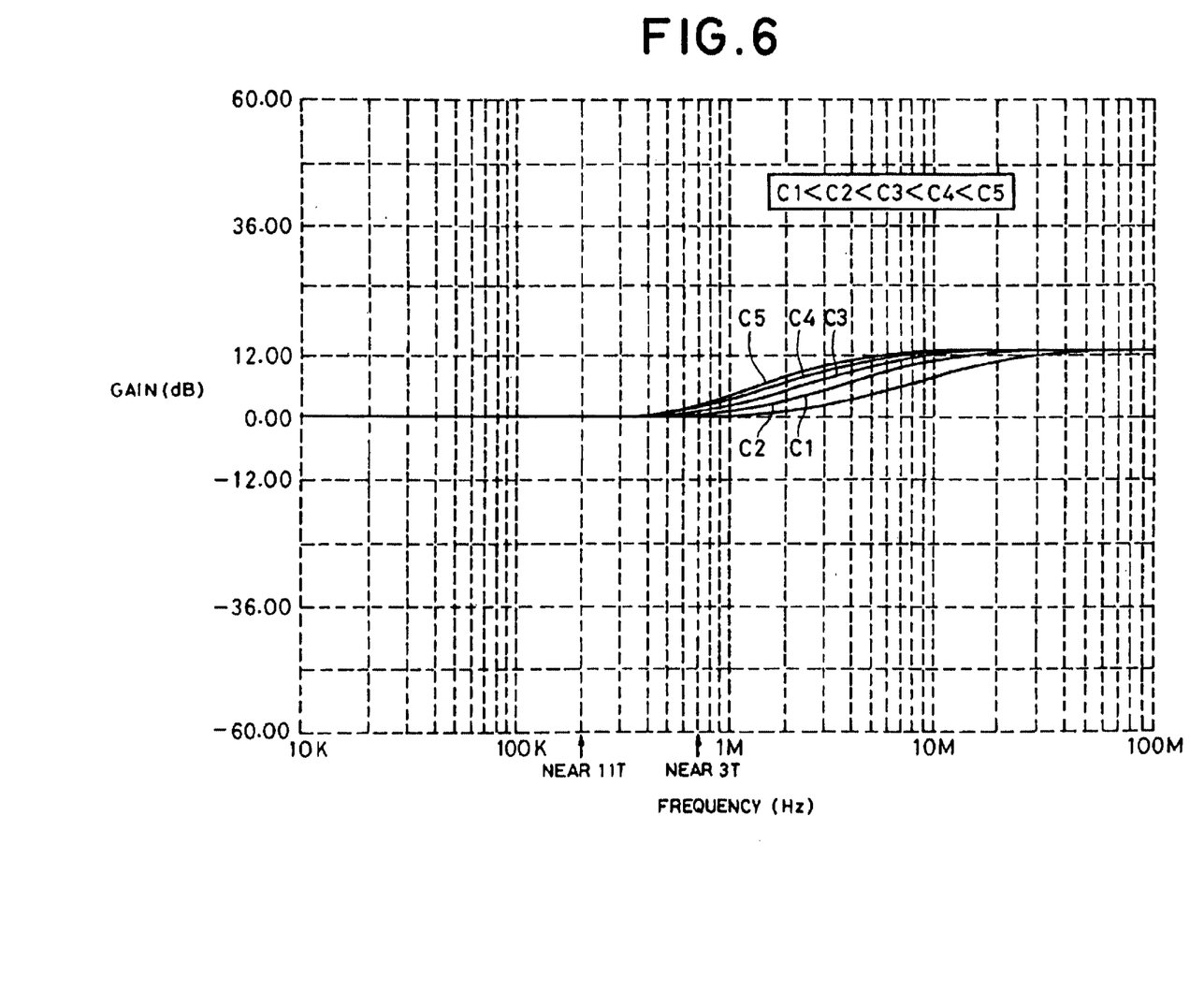
FIG. 6 is another characteristic graph illustrating the variably adjusted frequency characteristic of the frequency characteristic compensation circuit.

FIG. 6 illustrates changes in the frequency characteristics, as values of the variable capacitance element 12 are changed in the relationship of C1<C2<C3<C4<C5 with the variable resistors R3, R4 being fixed to reference values.

Figure 7:
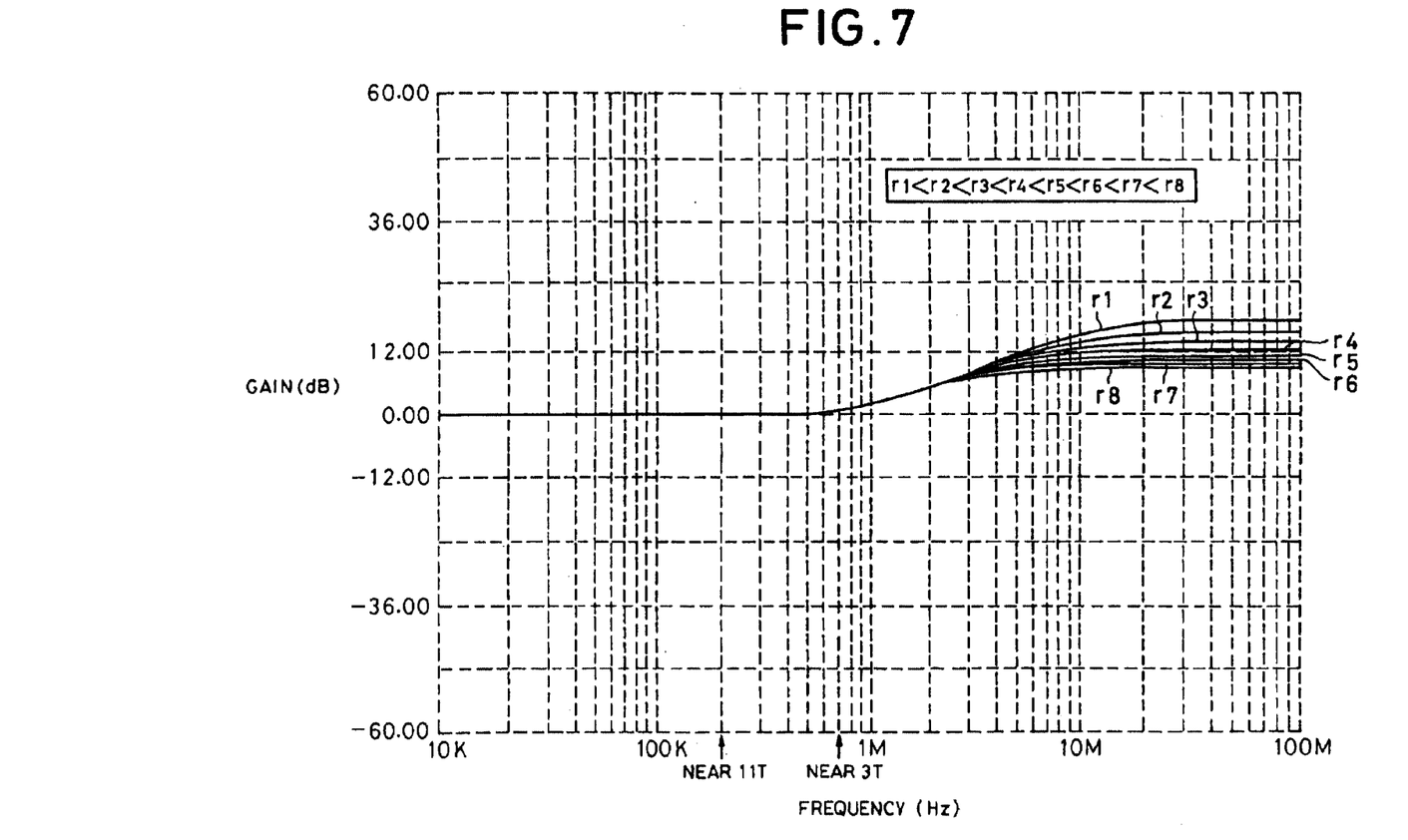
FIG. 7 is another characteristic graph illustrating the variably adjusted frequency characteristic of the frequency characteristic compensation circuit.

FIG. 7 illustrates changes in the frequency characteristics, as values of the variable resistor R3 are changed in the relationship of r1<r2<r3<r4<r5<r6<r7 with the variable resistor R4 and the variable capacitance element 12 being fixed to reference values.

The operation of the disk drive apparatus having such a configuration will now be described with reference to a flowchart shown in FIG. 8.

In this figure, suppose that a user loads the disk 1 in the disk drive apparatus and enters a command to the system controller 9 to start reproduction. In this case, in step S100, in response to the control data CNT from the system controller 9, each value of the variable resistors R3, R4 and the variable capacitance element 12 in the frequency characteristic compensation circuit 10 is set to a reference value. That is, the frequency characteristic of the frequency characteristic compensation circuit 10 is set to the frequency characteristic shown in FIG. 4.

Next, in step S102, initializing processing is initiated, such as reading a TOC (Table of Contents) information recorded in the lead-in area of the disk 1. During the initializing processing, the RF signal SRF outputted from the RF amplifier portion 4 is captured into the signal processing circuit 7. In step S104, the error rate sampling portion 7$c$, the 3T level sampling portion 7$d$, the jitter sampling portion 7$f$, and the 11T level sampling portion 7$g$ each generate and supply the following data to the system controller 9. The data includes the error rate data Derr, the data D3T representative of the level of the minimum width signal, the data Dps on a jitter, and the data D11T representative of the level of the maximum width signal.

Next, in step S106, in accordance with each data Derr, D3T, Dps, and D11T, the system controller 9 refers to the look-up table to generate the control data CNT for regulating the frequency characteristic of the frequency characteristic compensation circuit 10. Then, in step S108, in accordance with the control data CNT, the analog switches SW11–SW1$n$, SW21–SW2$m$, SW31–SW3$j$ are switched ON/OFF, so as to adjust the frequency characteristic of the frequency characteristic compensation circuit 10.

Then, in step S112, conventional reproduction processing is performed and repeated until the user enters the command for allowing the reproduction to end.

The RF signal SRF is generated as such by the frequency characteristic compensation circuit 10. Then, as shown in the characteristic graph of FIG. 9, an RF signal SRF is generated. The signal has a level about 3 dB higher than that of the minimum width signal having the highest frequency read from the minimum pit, with respect to the level of the maximum width signal having the lowest frequency read from the maximum pit. Here, the minimum and maximum pits are recorded on the disk 1.

Figure 9:
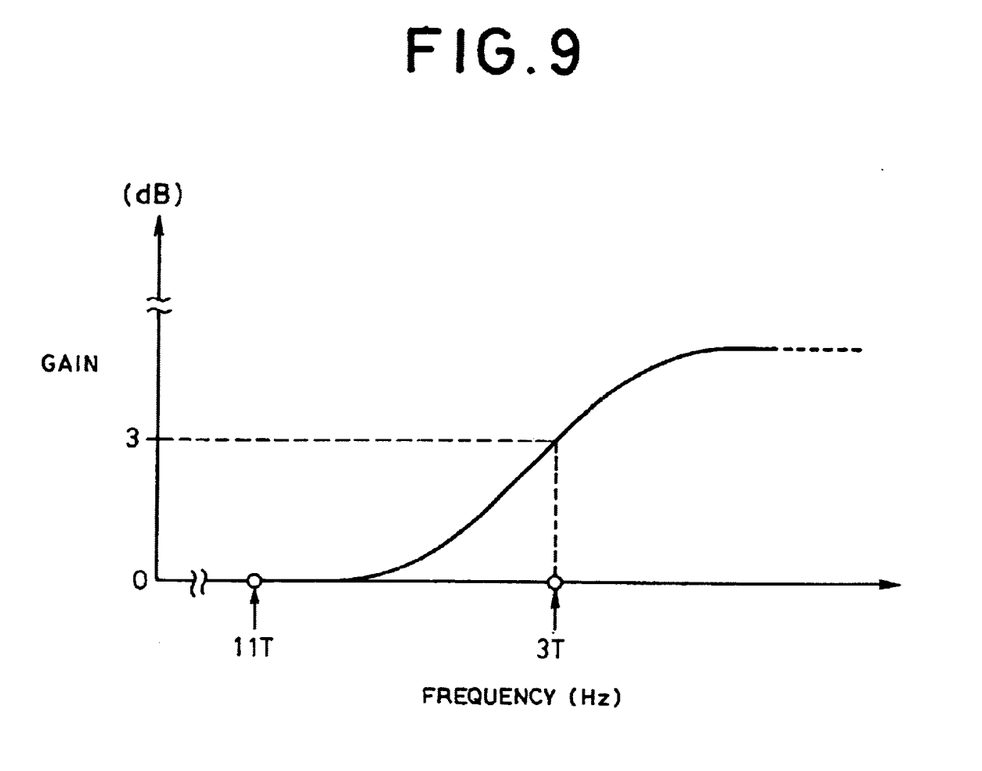
FIG. 9 is an explanatory characteristic graph illustrating a frequency characteristic of an RF signal compensated by the frequency characteristic compensation circuit.

Thus, even when an uncompensated RF signal SRF' has changed due to a difference in the type of the disk 1, the frequency characteristic of the frequency characteristic compensation circuit 10 can be variably adjusted to thereby generate an RF signal SRF having no distortion. This makes it possible to reduce variations in error correction rate in the signal processing circuit 7 and improve the error correction rate.

Figure 8:
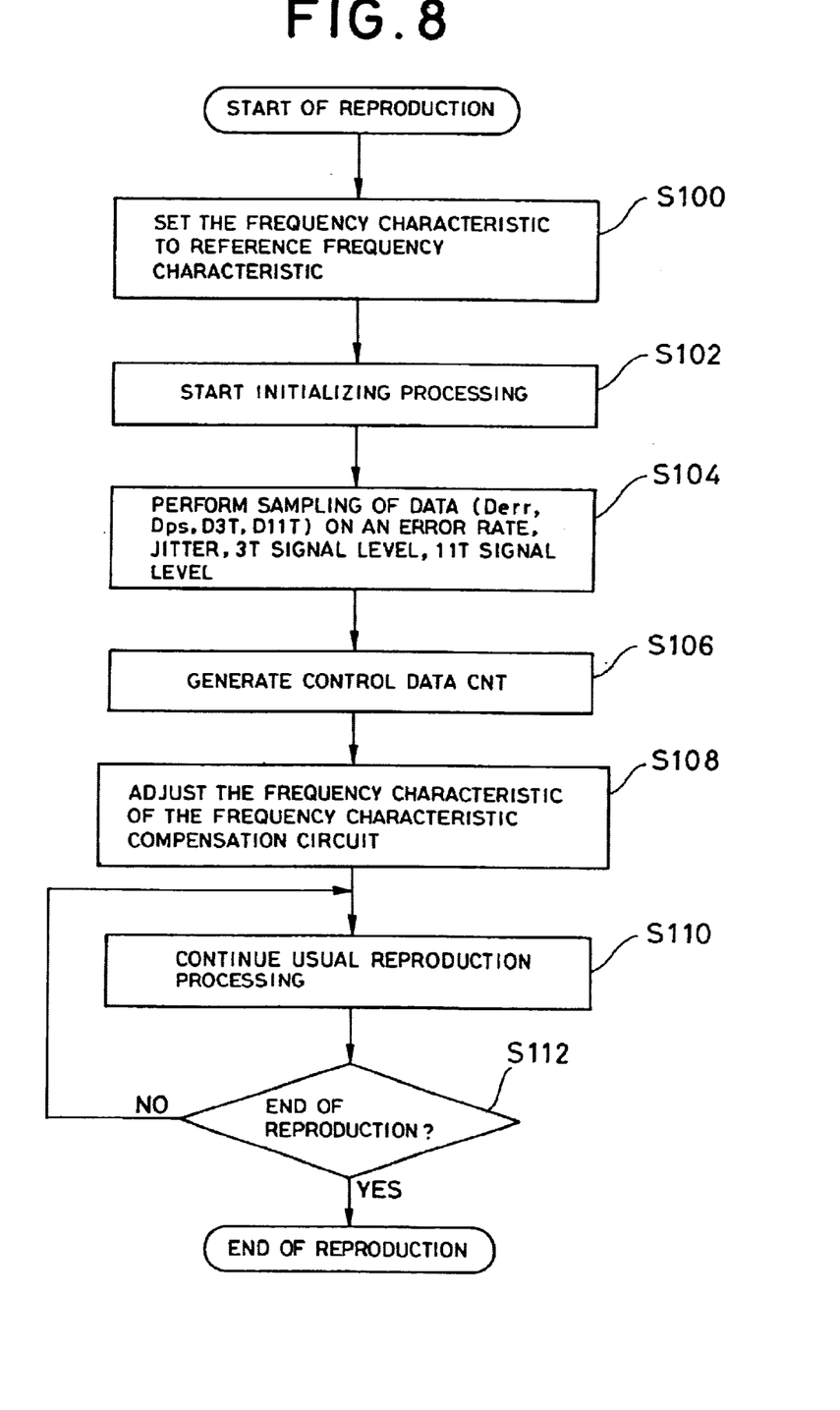
FIG. 8 is an explanatory flowchart illustrating the operation of a disk drive apparatus according to an embodiment of the present invention.

Incidentally, with reference to the flowchart shown in FIG. 8, the operation has been described in which the usual reproduction processing is initiated after the frequency characteristic of the frequency characteristic compensation circuit 10 is adjusted upon initialization. However, the frequency characteristic of the frequency compensation circuit 10 may be successively updated during the usual reproduction processing.

Figure 10:
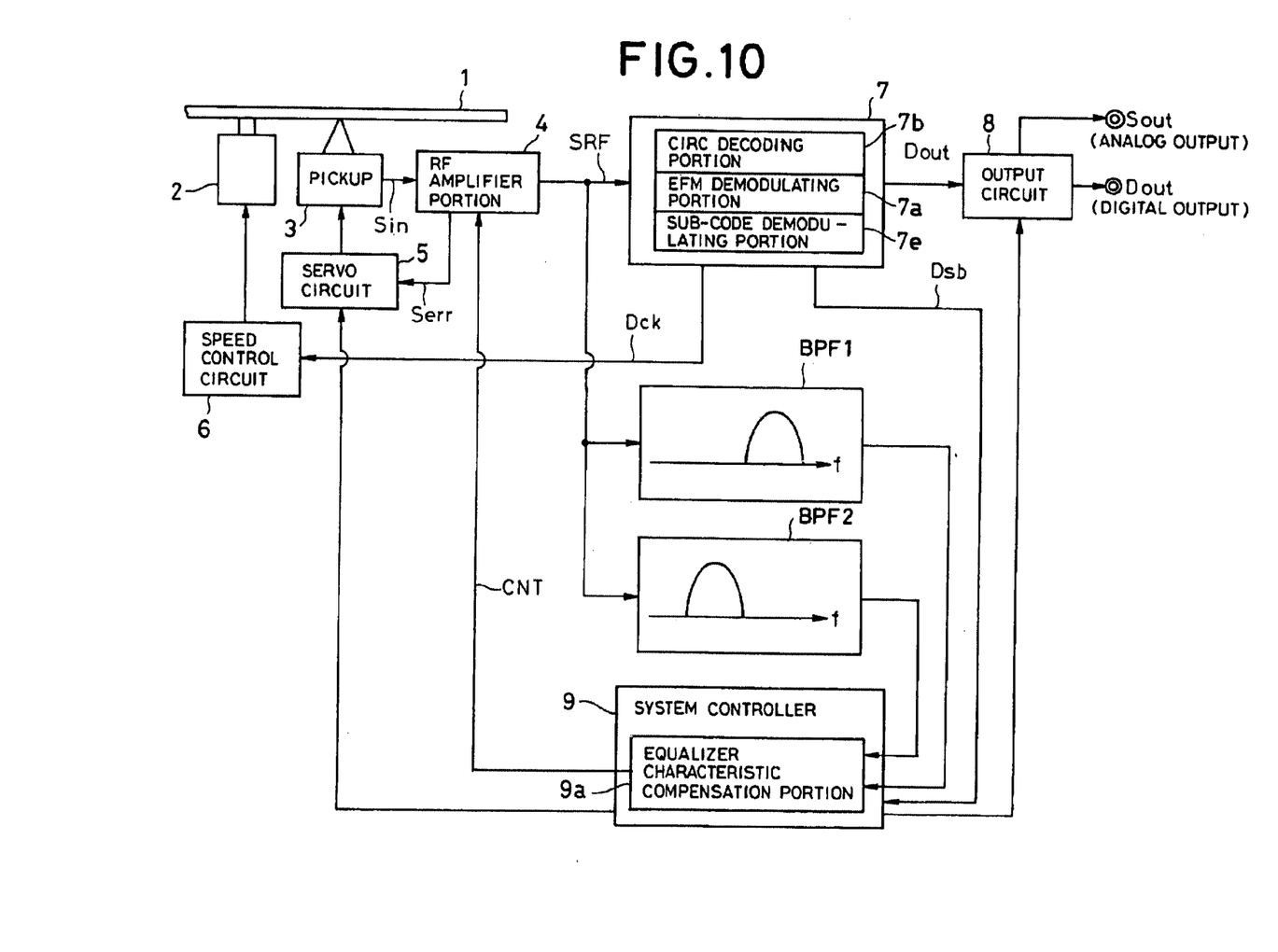
FIG. 10 is a block diagram illustrating the configuration of a variant of the disk drive apparatus according to an embodiment of the present invention.

The disk drive apparatus shown in FIG. 1 comprises the error rate sampling portion 7$c$, the 3T level sampling portion 7$d$, the jitter sampling portion 7$f$, and the 11T level sampling portion 7$g$. In accordance with each of the data Derr, Dps, D3T, and D11T sampled from these sampling portions, the frequency characteristic of the frequency compensation circuit 10 is variably adjusted. However, as shown in FIG. 10, the disk drive apparatus may be configured, as a variant, without the signal processing circuit 7. That is, the disk drive apparatus shown in FIG. 10 comprises band-pass filters BPF1, BPF2 for inputting the RF signal SRF outputted from the RF amplifier portion 4. The disk drive apparatus also comprises an equalizer characteristic compensation portion 9$a$ for variably adjusting the frequency characteristic of the frequency characteristic compensation circuit 10, provided in the analog amplifier portion 4, in accordance with the output from each of the band-pass filters BPF1, BPF2.

The band-pass filter BPF1 is set to a pass frequency band that allows a minimum width signal included in the RF signal SRF to pass therethrough and prevents other frequency components from passing therethrough. The band-pass filter BPF2 is set to a pass frequency band that allows a maximum width signal included in the RF signal SRR to pass therethrough and prevents other frequency components from passing therethrough.

The equalizer characteristic compensation portion 9$a$ is provided in the system controller 9, and calculates the ratio of the levels between the minimum width signal having a high frequency and the maximum width signal having a low frequency, which pass through the band-pass filters BPF1, BPF2, respectively. In addition, the equalizer characteristic compensation portion 9$a$ performs a calculation to determine the difference $\Delta$ between the level ratio and 3 dB by equation (1) below. Then, the equalizer characteristic compensation portion 9a supplies control data CNT, for setting the difference Δ to 0 dB, to the frequency characteristic compensation circuit 10 shown in FIG. 3, thereby adjusting the frequency characteristic.

$$\Delta=3-20 \log (\text{minimum width signal level/maximum width signal level}) \quad (1)$$

Even with such a configuration, even when the uncompensated RF signal SRF' has changed due to a difference in type of the disk 1, the frequency characteristic of the frequency characteristic compensation circuit 10 can be variably adjusted to thereby generate the RF signal SRF having no distortion. This makes it possible to reduce variations in error correction rate in the signal processing circuit 7 and improve the error correction rate.

Here, in the same manner as shown in the flowchart of FIG. 8, the frequency characteristic of the frequency characteristic compensation circuit 10 may be adjusted upon initialization or may be successively updated during the usual read processing.

Incidentally, the frequency characteristic compensation circuit 10 provided in the disk drive apparatus, shown in FIG. 1 and FIG. 10, is made up of an analog circuit. However, the frequency characteristic compensation circuit 10 may be made up of a digital filter, so that the filter coefficient of the digital filter is variably adjusted in accordance with the control data CNT from the system controller 9, thereby adjusting the frequency characteristic.

The frequency characteristic compensation circuit 10 may also be made up of a graphic equalizer, so that the filter coefficient of the graphic equalizer is variably adjusted in accordance with the control data CNT to thereby adjust the frequency characteristic.

As described above, the disk drive apparatus according to the present invention is provided with a compensation means for compensating the frequency characteristic of an RF signal generated by the signal generation means, in accordance with a read signal read by the pickup. Thus, it is made possible to generate an RF signal having a waveform that is not affected by a difference in the type of the information read/write media. Accordingly, performing demodulation such as EFM demodulation or CIRC demodulation in accordance with the compensated RF signal allows error rates to be reduced, thereby making it possible to improve the reading accuracy.

What is claimed is:

1. A disk drive apparatus for reading information recorded on an information read/write medium, comprising:
   a pickup for optically reading information recorded on said information read/write medium;
   signal generating means for generating an uncompensated RF signal, in accordance with a read signal read by said pickup;
   compensation means for compensating a frequency characteristic of said uncompensated RF signal to output a compensated RF signal;
   signal processing means for generating an error rate based on a code sequence generated when an error correction processing is performed on a demodulation signal reproduced from said compensated RF signal; and
   control means for adjusting the frequency characteristic of said compensation means with respect to said uncompensated RE signal, wherein said control means adjusts the frequency characteristic of said compensating means in response to error data representing said error rate.

2. A disk drive apparatus according to claim 1, wherein said signal processing means determines the ratio of level of a low frequency component to the level of a high frequency component of an RF signal outputted from said compensation means, and said control means adjusts the frequency characteristic of said compensation means so that the ratio of the levels takes on a predetermined value.

3. A disk drive apparatus according to claim 2, wherein said high frequency component is a minimum width information signal recorded on said information read/write medium, and said low frequency component is a maximum width information signal recorded on said information read/write medium.

4. A disk drive apparatus according to claim 1, wherein said compensation means is an equalizer circuit comprising variable resistors and a variable capacitance element.

5. A disk drive apparatus according to claim 4, wherein said control means adjusts values of said variable resistors or said variable capacitance element to thereby adjust the frequency characteristic of said compensation means.

6. A disk drive apparatus for reading information recorded on an information read/write medium, comprising:
   a pickup for optically reading information recorded on said information read/write medium;
   a signal generator for generating an uncompensated RF signal, in accordance with a read signal read by said pickup;
   a compensator for compensating a frequency characteristic of said uncompensated RF signal to output a compensated RF signal;
   a signal processing circuit including an error rate generator portion that generates an error rate based on a code sequence generated when an error correction processing is performed on a demodulation signal reproduced from said compensated RF signal; and
   a controller for adjusting the frequency characteristic of said compensator with respect to said uncompensated RF signal, wherein said controller includes a frequency adjuster portion that adjusts the frequency characteristic of said compensator receiving said uncompensated signal in response to error data representing said error rate.

7. A disk drive apparatus according to claim 6, wherein said signal processing circuit includes a determination portion that determines the ratio of level of a low frequency component to the level of a high frequency component of an RF signal outputted from said compensator, and said frequency adjuster portion of said controller adjusts the frequency characteristic of said compensator so that the ratio of the levels takes on a predetermined value.

8. A disk drive apparatus according to claim 7, wherein said high frequency component is a minimum width information signal recorded on said information read/write medium, and said low frequency component is a maximum width information signal recorded on said information read/write medium.

9. A disk drive apparatus according to claim 6, wherein said compensator is an equalizer circuit comprising variable resistors and a variable capacitance element.

10. A disk drive apparatus according to claim 9, wherein said controller adjusts values of said variable resistors or said variable capacitance element to thereby adjust the frequency characteristic of said compensator.

* * * * *